Patented Nov. 20, 1928.

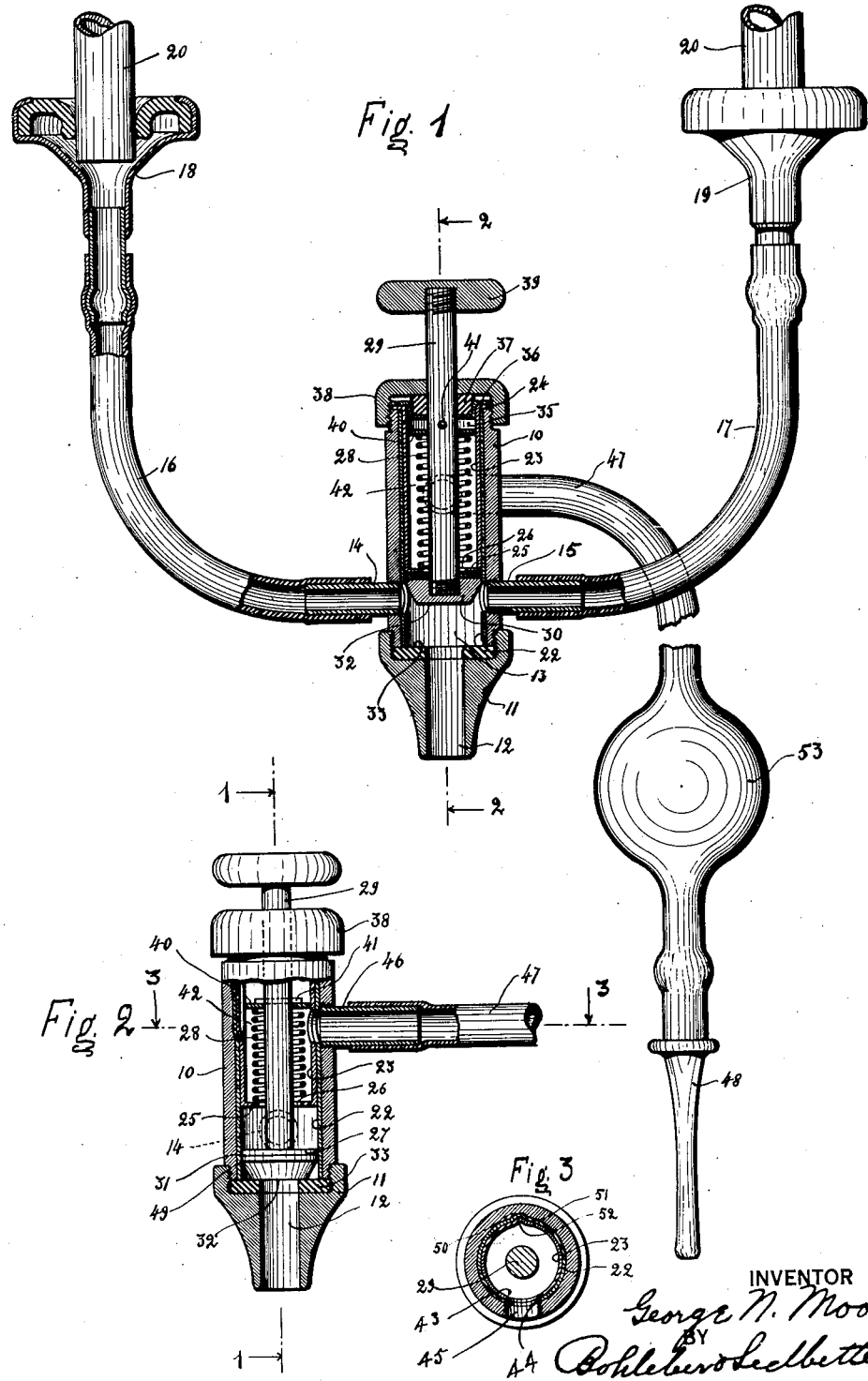

1,692,047

UNITED STATES PATENT OFFICE.

GEORGE N. MOORE, OF NEW YORK, N. Y.

HYDROTEETH CLEANSER.

Application filed September 30, 1925. Serial No. 59,576.

This invention relates to a device more particularly adapted to drive out decaying matter, particles of food and other accumulations between and on the teeth by the local application of a powerful jet of water. It is well known to those skilled in the dental art that some of the food particles lodged between the teeth cannot be removed by an ordinary tooth brush and a dentifrice, and accordingly an extensive use has been made of silk floss for this purpose.

More specifically my invention relates to a cleanser having means adapted to be connected to the respective spigots of a basin and so constructed that a jet of water is caused to flow from the cleanser in a fine yet powerful stream and by the application of this jet or stream to the teeth I am enabled to remove all such particles or accumulated deposits directly without difficulty. My invention therefore relates more particularly to the specific form of mixing device comprising, among other things, means thereon for readily determining the temperature and pressure of the water mixture so as to make sure that before its application and use it is neither too hot nor too cold.

Further objects, advantages, and features of construction of my device will more fully hereinafter appear, taken in connection with the accompanying drawings in which:

Fig. 1 illustrates a view of the preferred form of my device taken on the line 1—1 of Fig. 2, showing the same attached to the hot and cold water spigots of a wash basin.

Fig. 2 is a longitudinal section of the device, taken on the line 2—2 of Fig. 1, showing the respective mixing chambers and the hot and cold water inlets thereto.

Fig. 3 is a horizontal section on the line 3—3 of Fig. 2.

Referring to the drawings in detail the reference numeral 10 designates a casing preferably made of hard rubber or similar material. The lower end of this casing is provided with a screw threaded connection to the member 11 having an outlet or discharge port 12. The casing 10 and member 11, together with other mechanism hereinafter described, form a hot and cold water mixing chamber 13. Connected to the mixing chamber 13 is an inlet connection 14 for hot water and an inlet connection 15 for cold water. Connected respectively to the hot and cold water inlets 14 and 15 are two flexible tubes 16 and 17. These tubes are also connected by conventional means designated 18 and 19 respectively to the hot and cold water spigots 20 and 21 of the wash basin.

The casing 10 is equipped with a closely fitting internal brass sleeve 22. Within the sleeve 22 of the casing 10 is a chambered member 23 the upper end of which is provided with a flange 24 projecting outwardly and laterally over the upper end of the casing 10 and sleeve 22 and the lower end of which is provided with an inwardly projecting flange 25 defining a perforation 26 and having on the lower surface thereof a suitable gasket 27. The upper surface of this flange 25 serves, among other things, as a shoulder for the lower end of the spring 28 which surrounds the valve rod 29. The lower end of the rod 29 is equipped with a valve 30 the upper face 31 of which is normally seated against the gasket 27 and the lower face 32 of which is adapted to seat upon the gasket 33 to close the discharge port 12 in the outlet member 11. The upper end of the rod 29 projects outwardly from the casing through the stuffing box 34. This stuffing box has a portion 35 which telescopes within the sleeve member and a flange portion 36 which is seated upon the flange 24 of the sleeve member. This stuffing box is also equipped with suitable packing material 37. The upper end of the casing is provided with a cap 38 through which the valve rod also projects and when this cap is screwed substantially into the position illustrated in Fig. 2 the packing material in the stuffing box is compressed thereby and forms a fluid-tight connection between the stuffing box and the valve rod. The upper end of the valve rod is equipped with a suitable handle or member 39 for manually reciprocating the valve rod and the valve attached thereto. The upper end of the spring 28 bears against a washer or other stop 40 preferably loosely held thereon but limited in its upward movement in any suitable manner as by a suitable pin 41 projecting through the valve rod.

From the construction of the device just described it will be apparent enough that a second mixing chamber 42 is provided in the upper portion of the casing 10. The water from this mixing chamber is discharged therefrom through registering ports 43, 44 and 45, respectively located in the chambered member 23, sleeve member 22 and the casing 10, into a tube 46 having connected thereto a tubular member 47 on the outer end of which is mounted a removable nozzle or jet member 48.

Referring now more specifically to Fig. 1 of the drawings it will be seen that when the handle of the valve rod is in the position illustrated water flowing through the hot and cold water spigots 20 and 21 will be passed into the mixing chamber 13 and discharged through the outlet port 12. The purpose of this mixing chamber is to regulate the flow of water by the spigots until a suitable temperature and a suitable pressure of the mixed waters is attained, and this is determined by the operator placing his finger or hand below the discharge port 12 of the member 11. When the water is of the proper temperature and pressure the valve 30 is pushed downwardly into the mixing chamber 13 and until it seats upon the gasket 33. During this movement it will be noted that a part of the hot and cold water from the pipes or tubes 16 and 17 is discharged into the mixing chamber 13 and a part of it into the mixing chamber 42. However, when the valve has been pushed downwardly into contact with the gasket 33 all of the water from the inlet pipes 16 and 17 is discharged into the upper mixing chamber 42 and thence into and through the discharge tube 47. It will also be noted that the valve is conical shaped having only a slight cylindrical portion indicated by the reference numeral 49. The purpose of this is to avoid any tendency of the valve upon its downward movement to retard the flow of water through the pipes 16 and 17. It will be appreciated that in manipulating the valve it is ordinarily moved rather suddenly from its upper to its lower position and due to the head of the water in pipes 16 and 17 which would be created thereby a sudden movement of the valve would otherwise cause the instrument to be thrown off or disconnected from the spigots unless some such provision were made for the movement of the valve without effecting the free flow of the water. It will therefore be seen that the construction and arrangement of the valve and its parts are such as to overcome what would otherwise be a serious objection and consequently it will be obvious that this feature of my device is rather important.

The sleeve member 22, as before stated, fits the casing 10 rather snugly. It is provided with a longitudinal external grooved rib 50 thereon (see Fig. 3) which registers with or rather slidingly fits into a longitudinal groove 51 on the interior surface of the casing 10, the purpose of which is to assure that when these parts are assembled the outlet perforations in the sleeve member and the casing 10 will register with each other. The chambered member 23 is likewise equipped with a longitudinal rib 52 fitting the grooved rib 50 for a like purpose.

When the upper face 31 of the valve 30 is seated upon the gasket 27 a fluid tight chamber 42 is provided. This is important because I am enabled thereby to equip the discharge tube 47 with a compressible and expansible bulb 53 so that the device may be employed as a syringe. In other words it enables me to dip the jet member 48 into an antiseptic or other cleansing solution, draw said solution into the bulb 53 and then give the mouth and teeth a final wash with said solution as will be understood. This I regard as one of the more important features of my invention. It will therefore be seen that I have not only provided a very effective device for removing from between the teeth all accumulated matter but also for subsequently washing the mouth with a dentifrice or an antiseptic solution. It will be apparent enough that I may also use the device at will for either of these purposes without necessarily using it for the other. It will be noted that the jet member 48 is interchangeable so that any number of persons are enabled to use the device.

I have illustrated and described herein what I now regard as the preferred form of my invention. It is to be expressly understood, however, that I do not limit myself thereto as many changes may be made in points of detail and other embodiments resorted to without deviating from the true spirit and scope of my invention.

What I claim and desire to secure by Letters Patent is:

1. A device for cleansing teeth by the local application of a powerful jet of water, comprising a casing, hot and cold water tubes connected to said casing, a ported chamber for mixing the hot and cold water and for determining the temperature and pressure of the mixed water, a valve in said casing, a second chamber normally closed by said valve to the admission of water thereto, said valve adapted to be moved to close the port from said first mentioned chamber and to enable the mixed water to be discharged into the second mentioned chamber, and a mouth cleansing and washing device connected to the second mentioned chamber.

2. A device for cleansing teeth by the local application of a powerful jet of water, comprising a casing having two discharge ports therefrom one to determine the temperature and pressure of the water and the other leading to a mouth tube, a mouth tube, and means in said casing for controlling the discharge of water through either of said openings.

3. A device for cleansing teeth by the local application of a powerful jet of water comprising a casing having a normally fluid tight chamber therein, a mouth tube connected to said chamber, means for controlling the flow of water to and the discharge of the same from said chamber into said tube, and a collapsible and expansible means on said tube cooperating with said fluid tight chamber for washing the mouth with an antiseptic or other solution.

4. A device for cleansing teeth by the local application of a powerful jet of water, comprising a casing, hot and cold water tubes connected to said casing, a ported chamber in said casing for mixing the hot and cold water and for determining the temperature and pressure of the mixed water, a valve seat in the lower part of said chamber, a valve in said casing adapted to engage said valve seat, a second chamber having an admission port thereto normally closed by said valve against the admission of water thereto and also having a discharge port, said valve adapted to be moved to engage the seat to close the port from said first mentioned chamber and to enable the mixed water to be discharged into and through the second mentioned chamber, and a mouth cleansing and washing device connected to the discharge port of the second mentioned chamber.

5. A device for cleansing teeth by the local application of a powerful jet of water, comprising a casing having hot and cold water inlets thereto and two discharge ports therefrom one to determine the temperature and pressure of the water and the other leading to a mouth tube, a hot and cold water mixing chamber in said casing, a mouth tube, and means in said mixing chamber for controlling the discharge of the mixed water through either of said ports.

6. A mouth washing and cleansing device, comprising a casing having hot and cold water inlet connections thereto and also having a normally fluid tight chamber therein, means for simultaneously admitting hot and cold water to said chamber, a mouth tube connected to said chamber, means in said casing for controlling the flow of hot and cold water to and the discharge of the same from said chamber into said tube, and a collapsible and expansible means on said tube cooperating with said fluid tight chamber for washing the mouth with an antiseptic or other solution.

7. A device for cleansing teeth by the local application of a powerful jet of water, comprising a casing having laterial inlet ports and also having two discharge ports therefrom, one to determine the temperature and pressure of the water and the other leading to a mouth tube, means movable longitudinally of said casing for controlling the flow of water through said discharge ports, laterally extending inlet pipes for hot and cold water connected to said inlet ports, said inlet pipes being so positioned that, when grasped by the fingers, the palm of the hand is adapted to engage said longitudinally movable means to operate the same.

8. A device for cleansing teeth by the local application of a powerful jet of water, comprising a cylindrical casing having inlet means for hot and cold water, and a manually operated means for controlling the flow of water, said inlet means being so positioned on said casing that, when grasped by the fingers, the palm of the hand is adapted to engage said manually operated means.

9. A device for cleansing teeth by the local application of a powerful jet of water comprising a cylindrical casing formed with inlets for hot and cold water and an outlet, a cap for one end of the casing formed with an outlet, a cap for the other end of the casing formed with a valve stem bearing, a sleeve having apertures in register with the inlets and the outlet of the casing, a chamber member having a passage and an outlet in register with the casing outlet and a flange to overlie one end of the casing and a valve to control the flow through the outlet in the cap and the passage in the chamber member.

10. A device for cleansing teeth by the local application of a powerful jet of water, comprising a casing having two discharge ports therefrom one to determine the temperature and pressure of the water and the other leading to a mouth tube, and a valve in the casing for controlling the discharge of water through the discharge ports, said valve being held in position to direct the water to the mouth tube by the pressure of the water in the casing 11. A device for cleansing teeth by the local application of a powerful jet of water, comprising a casing having two discharge ports therefrom one to determine the temperature and pressure of the water and the other leading to a mouth tube, a valve in the casing closing one of the ports, a spring normally holding the valve to close the port to the mouth tube, and means to operate the valve to open the port to the mouth tube and close the other port, said valve being held in open position with respect to the mouth tube port by the pressure of the water in the casing opposing the valve spring.

In testimony whereof, I have hereunto set my hand this 29th day of September, 1925.

GEORGE N. MOORE.